United States Patent
Klein et al.

(10) Patent No.: US 12,527,726 B2
(45) Date of Patent: Jan. 20, 2026

(54) PIGMENT MIXTURE

(71) Applicant: Susonity Commercial GmbH, Gernsheim (DE)

(72) Inventors: Sylke Klein, Rossdorf (DE); Lilia Heider, Gernsheim (DE); Carsten Lorenz, Darmstadt (DE); Sabine Schoen, Herten (DE)

(73) Assignee: SUSONITY COMMERCIAL GMBH, Gernsheim (DE)

( * ) Notice: Subject to any disclaimer, the term of this patent is extended or adjusted under 35 U.S.C. 154(b) by 161 days.

(21) Appl. No.: 17/360,341

(22) Filed: Jun. 28, 2021

(65) Prior Publication Data

US 2021/0322285 A1    Oct. 21, 2021

Related U.S. Application Data

(63) Continuation of application No. 14/333,608, filed on Jul. 17, 2014, now abandoned.

(30) Foreign Application Priority Data

Jul. 19, 2013 (DE) .................. 102013012023.3

(51) Int. Cl.
| | |
|---|---|
| *A61K 8/02* | (2006.01) |
| *A61K 8/19* | (2006.01) |
| *A61K 8/25* | (2006.01) |
| *A61K 8/29* | (2006.01) |
| *A61Q 1/02* | (2006.01) |
| *A61Q 1/10* | (2006.01) |
| *A61Q 1/12* | (2006.01) |
| *A61Q 19/00* | (2006.01) |
| *C09C 1/00* | (2006.01) |

(52) U.S. Cl.
CPC ............ *A61K 8/025* (2013.01); *A61K 8/19* (2013.01); *A61K 8/25* (2013.01); *A61K 8/29* (2013.01); *A61Q 1/02* (2013.01); *A61Q 1/10* (2013.01); *A61Q 1/12* (2013.01); *A61Q 19/00* (2013.01); *C09C 1/0021* (2013.01); *C09C 1/0024* (2013.01); *C09C 1/0039* (2013.01); *C09C 1/0081* (2013.01); *A61K 2800/412* (2013.01); *A61K 2800/43* (2013.01); *A61K 2800/621* (2013.01); *A61K 2800/63* (2013.01); *C01P 2004/51* (2013.01); *C01P 2004/61* (2013.01); *C01P 2004/62* (2013.01); *C01P 2006/12* (2013.01); *C01P 2006/19* (2013.01); *C09C 2200/1004* (2013.01); *C09C 2200/102* (2013.01); *C09C 2200/302* (2013.01); *C09C 2200/303* (2013.01); *C09C 2200/306* (2013.01); *C09C 2220/106* (2013.01)

(58) Field of Classification Search
CPC . A61K 8/00; A61K 8/02; A61K 8/025; A61K 8/0254; A61K 8/0266; A61K 8/0262
See application file for complete search history.

(56) References Cited

U.S. PATENT DOCUMENTS

| | | | |
|---|---|---|---|
| 6,117,435 A | 9/2000 | Painter et al. | |
| 6,648,958 B2 | 11/2003 | Anselmann et al. | |
| 8,524,261 B2 | 9/2013 | Schmidt et al. | |
| 2003/0035883 A1* | 2/2003 | Nishikata | A61Q 1/12 427/2.17 |
| 2004/0177789 A1 | 9/2004 | Heider et al. | |
| 2011/0104220 A1* | 5/2011 | Schmidt | A61K 8/29 106/459 |

FOREIGN PATENT DOCUMENTS

| | | | | |
|---|---|---|---|---|
| CN | 1318092 A | * | 10/2001 | ........... C09C 1/0087 |
| EP | 1063265 A1 | | 12/2000 | |
| EP | 1115796 B1 | | 1/2003 | |
| EP | 2316891 B1 | | 2/2014 | |
| JP | 11335240 A | | 12/1999 | |
| JP | 2004197099 A | | 7/2004 | |
| WO | 9811865 A1 | | 3/1998 | |
| WO | 9966883 A2 | | 12/1999 | |
| WO | 0015720 A1 | | 3/2000 | |

OTHER PUBLICATIONS

English translation of Search Report for corresponding Japan Application No. 2014-146864.4 dated May 29, 2018.
English translation of Search Report for corresponding Chinese Application No. 2014-10342837.4 dated Jan. 12, 2018.
Search Report for corresponding European Application No. EP14002208 dated Dec. 3, 2014.
[2013] "Light Diffusing—Merck's Ronasphere LDP" http://www.merck-performance-materials.de/de/cosmetics/ronaflairronaflair_ldp/rona.

* cited by examiner

*Primary Examiner* — Jennifer Chin
(74) *Attorney, Agent, or Firm* — Millen, White, Zelano & Branigan, P.C.; Brion P. Heaney

(57) ABSTRACT

The present invention relates to a pigment mixture based on spherical particles having a defined particle-size distribution, and to the use thereof in paints, coatings, printing inks, security printing inks, plastics, ceramic materials, glasses, in cosmetic formulations, as tracer, as filler and for the preparation of pigment preparations and dry preparations.

21 Claims, No Drawings

PIGMENT MIXTURE

SUMMARY OF THE INVENTION

The present invention relates to a pigment mixture based on spherical particles having a defined particle-size distribution, and to the use thereof in paints, coatings, printing inks, security printing inks, plastics, ceramic materials, glasses, in cosmetic formulations, as tracers, as fillers and for the preparation of pigment preparations and dry preparations.

The term pigments is applied to colorants which are insoluble in the application medium. Typical examples of organic pigments are phthalocyanines, diketopyrrolopyrroles, azo pigments and quinacridones. Of the inorganic pigments, mention may be made of the various types of iron oxides or also ultramarine. Pigments are generally distinguished from dyes, which are soluble in the application medium, by higher chemical and photochemical stability.

Fillers can be regarded as a special form of pigments. In the case of fillers, the "coloring" function is not at the forefront. In the case of industrial fillers, factors such as the increase in the mechanical stability, the abrasion resistance, the weather stability or also the production costs are instead crucial for their use.

Fillers are also widely used in cosmetic formulations. For example, powders may comprise up to 50% of fillers, based on the final formulation. Typical values are 10-15% of fillers in lipsticks and 2-6% of fillers in emulsions. Cosmetic fillers fulfil completely different functions: in foundations, they prevent an undesired greasy sheen on the skin due to the so-called matting effect, while in powders they help, for example, to improve the pouring behavior or the application properties to the skin. In deodorant products, the high liquid absorption capacity of some fillers is utilized.

Before their use in the system to be pigmented, fillers or pigments in cosmetics have to be brought into a form which facilitates easy dispersion and a reproducible color. These pretreatments of the pigments, for example grinding, which have a crucial influence on the quality of the end product are time-consuming and expensive. It is furthermore disadvantageous that the color of the pigment is changed on wetting. For cosmetic formulations, the pigments must additionally have a good skin feel, which the classical fillers only exhibit to a small extent.

Fillers based on spherical particles, in particular $SiO_2$ spheres, are increasingly being employed in cosmetics, since they impart a natural appearance on human skin on the one hand and can make wrinkles less visible on the other hand.

Inorganic spherical fillers which are covered with a coloring layer are known, for example, from the published specifications JP 62-288662, JP 11-139926, JP 11-335240 and DE 199 29 109.

WO 00/15720 discloses a pigment mixture based on spherical $SiO_2$ particles having high light diffusion, where some of the $SiO_2$ spheres are coated with $TiO_2$ and $SiO_2$ and the others are coated with $TiO_2$ and $Fe_2O_3$.

WO 99/66883 describes $SiO_2$ spheres which are coated with metal oxides, such as titanium oxide, iron oxide or zinc oxide, and have a final $SiO_2$ layer. The $SiO_2$ spheres coated in this way are employed in cosmetic formulations as a mixture with interference pigments.

The fillers based on $SiO_2$ spheres which are known from the prior art exhibit a relatively good skin feel, but have the disadvantage that they have an excessively high scattering capacity. The reason for this can be found in the structure of the metal-oxide layers of the spherical fillers. The functional pigments from the prior art generally consist of very small particles, i.e. they have particle sizes of 0.5-100 nm, which cover the surface of the carrier spheres in a uniform arrangement. Light is reflected at the layer surface, causing gloss. At the same time, however, a considerable degree of scattering occurs since individual particles form on the layer and act as strong centers of scattering. As a consequence of these two opposing effects (gloss and scattering), the pigments have a white and unnatural appearance on the skin.

The present invention therefore provides a functional pigment which, besides a good skin feel, simultaneously has good dispersibility in cosmetic formulations, chemical and photochemical stability and a pure color matched to the skin. In addition, the pigment should, when applied to the skin as a pure powder, in creams, emulsions, foundations and the like, exhibit a soft and uniform and natural appearance of the skin. It is furthermore desired for the pigment to impart a slight increase in the firmness, in particular of liquid and pasty preparations, and to guarantee the stability of the preparation. This makes it significantly easier to distribute the cosmetic preparations on the skin. Thus, high-viscosity creams, i.e. solid foundations, can be prepared which nevertheless have very good distribution ability on the skin or very good removal behavior on removal from the container.

Besides these product properties, the invention also provides simple industrial preparation of the pigment. It is possible to monitor the setting of certain properties, such as, for example, the hiding power and the specifically adjustable color intensity, of the pigment in a simple manner in the course of the preparation process.

Surprisingly, it has been found that pigment mixtures based on spherical particles having a defined particle-size distribution which are coated on the surface with $TiO_2+SiO_2$ or $TiO_2$+iron oxide allow better adjustment of the hiding power and a significantly more natural appearance of the skin and in addition have a better skin feel than the fillers/pigments from the prior art. In addition, the pigment mixture according to the invention exhibits the desired influence on the texture and stability, i.e. it slightly increases the viscosity of emulsions or the firmness of foundations without adversely affecting the application properties, and at the same time it maintains the stability of the preparation.

The invention therefore relates to a pigment mixture based on spherical particles, characterised in that it comprises at least two components A and B, where component A is based on spherical particles having a particle-size distribution $D_{90}$ of the uncoated particles of 0.5-15 μm, where the particles are coated on the surface firstly with $TiO_2$ and subsequently with $SiO_2$, and component B is based on spherical particles having a particle-size distribution $D_{90}$ of the uncoated particles of 0.5-15 μm, where the particles are coated on the surface firstly with $TiO_2$ and subsequently with iron oxide or with a mixture of $TiO_2$ and iron oxide.

The spherical pigments according to the invention exhibit
a more natural color-matched appearance of the skin
easier dispersibility
improved processability
a hiding power which can be adjusted within broad limits
an improved skin feel
an improved texture of the cosmetic preparations
improved application behavior of the cosmetic formulations
compared with the pigments from the prior art.

The invention furthermore relates to the use of the pigment mixture according to the invention in paints, coatings, preferably in industrial coatings, printing inks, security printing inks, plastics, ceramic materials, glasses, as tracer, as filler and in particular in cosmetic formulations. Furthermore, the pigments according to the invention are also suitable for the preparation of pigment preparations and for the preparation of dry preparations, such as, for example, granules, pearlets, chips, pellets, sausages, briquettes, etc. The dry preparations are used, in particular, in printing inks and in cosmetics.

Suitable base substrates are spherical particles, as are, for example, commercially available, inter alia from Sunjin Chemicals, Kobo, Ikeda, Asahi Glass, Miyoshi, Omega Materials, 3M, ABC NanoTech, China New Technology, PQ Corporation, Sibelco or Evonik. Preferred spherical particles are selected from the group magnesium silicate, aluminium silicate, alkali-metal aluminium silicates, alkaline-earth metal aluminium silicates and combinations thereof, $SiO_2$ spheres, glass beads, hollow glass beads, aluminium oxide and polymeric beads comprising ethylene-acrylic acid copolymers, ethylene-methacrylate copolymers, HDI-trimethylol hexyl lactone copolymers, nylon, polyacrylates, polymethyl methacrylate copolymers, polyethylene, polymethylsilsesquioxanes and combinations thereof.

Particularly preferred spherical substrates are $SiO_2$ spheres, as are commercially available, for example, under the trade names SUNSIL, MSS-500, SHERON, SUN-SPHERE, Silicabeads SB, OMEGA-SIL, OMEGA-Spheres, SPHERICEL, Q-Cel, Ceramic Microspheres, Glasbubbles iM-K, SILNOS, SS-T4, SORBOSIL, AEROSIL, Flo-Beads, BPD, Daiamid, MSP, TOSPEARL.

The BET surface area, determined by nitrogen absorption, of the suitable spherical base particles is generally 1-1000, preferably 10-750, in particular 20-550 m$^2$/g. The BET surface area in this patent application is determined in accordance with DIN ISO 9277: 2003-05.

The spherical base substrates of the pigment mixture according to the invention preferably have a particle diameter in the range 0.1-100 μm, in particular 0.3-60 μm and very particularly preferably 0.5-15 μm. The particles of components A and B here may be identical or different. The particles of components A and B are preferably identical both in their composition and also in the particle-diameter distribution and in the $D_{90}$ value and merely have a different coating on the respective surface.

The $D_{90}$ value indicates the maximum particle diameter, determined by means of laser diffraction, of 90% by vol. of the particles; i.e., 90% by volume of the particles have a diameter of the $D_{90}$ value, or less.

Coating(s) in this patent application is taken to mean the complete covering of the spherical base particles in each case with $TiO_2$ and $SiO_2$ in the case of component A and in each case with $TiO_2$ and iron oxide in the case of component B.

The spherical base particles of component A are coated on the surface (1st layer) with $TiO_2$. The $TiO_2$ here can be in the rutile or anatase modification, preferably in the anatase form. The $TiO_2$ layer preferably has a layer thickness of 10-500 nm, in particular 25-400 nm and very particularly preferably 50-300 nm. The layer thickness here is not dependent only on the coating parameters, but instead also on the sphere size of the base spheres. The smaller the spheres and thus the sphere surface area, the thicker the applied $TiO_2$ layer for the same coating parameters present. Merely a doubling of the sphere diameter can result in a halving of the $TiO_2$ layer thickness, which is in the above-mentioned range of the particle-size distribution from 0.5-15 μm.

An $SiO_2$ layer is subsequently applied to the $TiO_2$ layer. This final $SiO_2$ layer serves, inter alia, for improving the dispersibility, the chemical and photochemical stability and the skin feel. The $SiO_2$ layer preferably has a layer thickness of 10-500 nm, in particular 25-400 nm and very particularly preferably 50-300 nm.

The spherical base particles of component B are coated on the surface (1st layer) with $TiO_2$. The $TiO_2$ here can be in the rutile or anatase modification, preferably in the anatase form. An iron oxide layer, for example comprising $Fe_2O_3$ or $Fe_3O_4$, preferably an $Fe_2O_3$ layer, is subsequently applied to the $TiO_2$ layer. The layer thicknesses of the $TiO_2$ and iron oxide layers here may be identical or different.

The $TiO_2$ layer preferably has a layer thickness of 50-400 nm, in particular 200-400 nm and very particularly preferably 100-200 nm. The iron oxide layer preferably has layer thicknesses of 5-300 nm, in particular 10-200 nm and very particularly preferably 20-100 nm.

Depending on the layer thickness and the subsequent calcination, various colors from yellow, brown to red shades can be set.

However, the coating of component B may also be a mixture of $TiO_2$ and iron oxide. This mixture preferably consists of $TiO_2/Fe_2O_3$ and/or of pseudobrookite $Fe_2TiO_5$. The $TiO_2$/iron oxide mixture preferably has a layer thickness of 55-700 nm and very particularly preferably 120-300 nm.

Particularly preferred components A and B of the pigment mixture according to the invention have the following covering on the surface:

spherical base substrate+$TiO_2$+$SiO_2$
spherical base substrate+$TiO_2$+$Fe_2O_3$
spherical base substrate+$TiO_2/Fe_2O_3$
spherical base substrate+$Fe_2TiO_5$.

The pigments of component A and the pigments of component B can be mixed with one another in any ratio. For color optimization in the particular application, preference is given to a mixing ratio (parts by weight) of component A to component B of 99:1 to 90:10, in particular 98.5:1.5 to 95:5 and very particularly preferably 98:2 to 96:4. The mixing ratio here is based on the weight.

The pigment mixture according to the invention generally has an oil absorption value of 10-200 g/100 g, in particular 20-200 g/100 g, very particularly preferably 50-150 g/100 g. The oil absorption value in this patent application is determined in accordance with DIN ISO 787/5-1980 (E).

The pigment mixtures according to the invention improve, in particular, the texture of cosmetics by achieving easier application and more uniform distribution on the skin and improving the skin feel. Since the pigment mixture according to the invention is built up on a non-toxic mineral basis and comprises predominantly inorganic components, it is very well tolerated by the skin.

The covering of the spherical base particles can be carried out in a one-pot process. The pigments according to the invention can be prepared relatively simply in various ways. The spherical particles can be covered with one or more coatings by wet-chemical coating or by the CVD or PVD process.

The covering of the spherical base particles of component A and/or B is preferably carried out in the wet-chemical method by hydrolytic deposition of the metal oxides or metal hydroxides from salt solutions thereof.

The metal-oxide layers on the spherical particles of component A or component B are preferably applied by wet-chemical methods, where in general the wet-chemical coating methods developed for the preparation of pearlescent pigments can be used. Methods of this type are described, for example, in U.S. Pat. Nos. 3,087,828, 3,087,829, 3,553, 001, DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017, DE 196 18 568, EP 0 659 843, or also in further patent documents and other publications known to the person skilled in the art.

In the case of wet-chemical coating, the spherical particles of component A or component B are suspended in water, and one or more hydrolyzable metal salts are added at a pH which is suitable for hydrolysis, which is selected so that the metal oxides or metal oxide hydrates are precipitated directly onto the spheres. The pH is usually kept constant by simultaneous metered addition of a base or acid. The pigments are subsequently separated off, washed and dried, preferably at 50-350° C., in particular at 80-150° C., and optionally calcined, where the calcination temperature can be optimised with respect to the coating present in each case. In general, the calcination temperatures are between 250 and 1100° C., preferably between 350 and 900° C. Depending on the calcination temperature, hues in yellow, brown and red can be achieved. In particular at calcination temperatures >700° C., the yellow shades predominate, since mixed oxides form from titanium oxide and iron oxide, for example pseudobrookite, in the case of component B.

If desired, the pigments can be separated off after application of individual coatings, washed and optionally calcined and then re-suspended again for the precipitation of the further layers or in order to establish the final hue, for example addition of the $TiO_2/Fe_2O_3$-coated spherical particles to the $TiO_2/SiO_2$-coated particle suspension.

The coating can furthermore also be carried out by gas-phase coating in a fluidized-bed reactor, where, for example, the processes proposed in EP 0 045 851 and EP 0 106 235 for the preparation of pearlescent pigments can be used correspondingly.

For the application of a final $SiO_2$ layer, the process described in DE 196 18 569 is preferably used. For the production of the $SiO_2$ layer, sodium or potassium water-glass solution is preferably employed.

When the desired amount of the layer material has precipitated, the reaction is interrupted, and a pH which is suitable for work-up, for example pH 5, is set.

For work-up, the coated spherical particles are filtered off, washed with water and preferably dried at temperatures of 50-150° C. for a period of 1-20 h and optionally calcined at temperatures of 350-950° C. for 0.1-2 h. Finally, the pigment of component A or component B or the pigment mixture is sieved. In the final step, the separately worked-up components A and B are mixed with one another in the desired ratio if the mixing was not already carried out—as described above—in suspension.

The hue and hiding power of components A and B can be varied within broad limits through the different choice of the coating materials and the coverage rates or the layer thicknesses resulting therefrom and the calcination temperatures used. Fine tuning for a certain hue can be achieved, beyond the pure choice of amounts, by approaching the desired color under visual or measurement-technology control.

In order to increase the light, water and weather stability, it is frequently advisable, depending on the area of application, to subject the pigment of component A or component B to post-coating or post-treatment. Suitable post-coating or post-treatment methods are, for example, those described in German patent 22 15 191, DE-A 31 51 354, DE-A 32 35 017 or DE-A 33 34 598. This post-coating further increases the chemical and photochemical stability or makes handling of the pigment mixture, in particular incorporation into various media, easier. In order to improve the wettability, dispersibility and/or compatibility with the application media, functional coatings comprising $Al_2O_3$ or $ZrO_2$ or mixtures thereof can be applied to the pigment surface. Furthermore, organic post-coatings are possible, for example with silanes, as described, for example, in EP 0090259, EP 0 634 459, WO 99/57204, WO 96/32446, WO 99/57204, U.S. Pat. Nos. 5,759,255, 5,571,851, WO 01/92425 or in J. J. Ponjeé, Philips Technical Review, Vol. 44, No. 3, 81 ff. and P. H. Harding, J. C. Berg, J. Adhesion Sci. Technol. Vol. 11 No. 4, pp. 471-493.

The invention also relates to a process for the preparation of the pigment mixture according to the invention.

The pigment mixture according to the invention is compatible with a multiplicity of color systems, preferably from the area of paints, coatings and printing inks. A multiplicity of binders, in particular water-soluble products, as marketed, for example, by BASF, Marabu, Pröll, Sericol, Hartmann, Gebr. Schmidt, Sicpa, Aarberg, Siegwerk, GSB-Wahl, Follmann, Ruco or Coates Screen INKS GmbH, are suitable for the preparation of printing inks for, for example, gravure printing, flexographic printing, offset printing or offset overprint varnishing. The printing inks can be water-based or solvent-based.

Particularly effective effects, such as smoothing of surfaces and levellingout of unevenness (wrinkles, pores, recesses, microcracks, etc.), can be achieved with the pigment mixture according to the invention in the particle-size range of 0.5-15 µm indicated in the various application media, for example in cosmetic formulations, such as, for example, nail varnishes, lipsticks, compact powders, gels, lotions, soaps, toothpaste, in paints, in industrial coatings and powder coatings, and in plastics and in ceramics.

Owing to the good skin feel and the very good skin adhesion, the pigment mixture according to the invention is particularly suitable as filler in decorative cosmetics, but also for personal care applications, such as, for example, body lotions, emulsions, soaps, shampoos, etc.

The pigment mixture according to the invention has a stabilizing action, as is desired, for example, in creams, emulsions and lotions.

It goes without saying that the pigment mixture according to the invention can also advantageously be employed for the various applications as a blend with, for example, metal-effect pigments, for example based on iron flakes or aluminium flakes;

pearlescent pigments based on metal oxide-coated synthetic mica flakes, natural mica flakes, glass flakes, $Al_2O_3$ flakes, $Fe_2O_3$ flakes or $SiO_2$ flakes;

interference pigments based on metal oxide-coated synthetic mica flakes, natural mica flakes, glass flakes, $Al_2O_3$ flakes, $Fe_2O_3$ flakes or $SiO_2$ flakes;

goniochromatic pigments;

multilayered pigments (preferably comprising 2, 3, 4, 5 or 7 layers) based on metal oxide-coated synthetic mica flakes, natural mica flakes, glass flakes, $Al_2O_3$ flakes, $Fe_2O_3$ flakes or $SiO_2$ flakes;

organic dyes;

organic pigments;

inorganic pigments, such as, for example, transparent and opaque white, colored and black pigments;

flake-form iron oxides;

carbon black.

The pigment mixture according to the invention can be mixed in any ratio with commercially available pigments and/or further commercially available fillers.

Commercially available fillers which may be mentioned are, for example, natural and synthetic mica, nylon powder, pure or filled melamine resins, talc, glasses, kaolin, oxides or hydroxides of aluminium, magnesium, calcium, zinc, BiOCl, barium sulfate, calcium sulfate, calcium carbonate, magnesium carbonate, carbon, boron nitride and physical or chemical combinations of these substances. There are no restrictions with respect to the particle shape of the filler. It can be, for example, flake-shaped, spherical or needle-shaped, in accordance with requirements.

The pigment mixture according to the invention can of course also be combined in the formulations with any type of cosmetic raw materials and assistants. These include, inter alia, oils, fats, waxes, film formers, preservatives and assistants which generally determine applicational properties, such as, for example, thickeners and rheological additives, such as, for example, bentonites, hectorites, silicon dioxides, Ca silicates, gelatins, high-molecular-weight carbohydrates and/or surface-active assistants, etc.

The formulation comprising the pigment mixture according to the invention can belong to the lipophilic, hydrophilic or hydrophobic type. In the case of heterogeneous formulations having discrete aqueous and non-aqueous phases, the pigment mixture according to the invention may be present in only one of the two phases in each case or alternatively distributed over both phases.

The pH values of the formulations can be between 1 and 14, preferably between 2 and 11 and particularly preferably between 4 and 10.

No limits are set for the concentrations of the pigment mixture according to the invention in the formulation. They can be—depending on the application—between 0.001 (rinse-off products, for example shower gels) and 60%. The pigment mixture according to the invention may furthermore also be combined with cosmetic active compounds. Suitable active compounds are, for example, insect repellents, UV A/BC protection filters (for example OMC, B3, MBC), anti-ageing active compounds, vitamins and derivatives thereof (for example vitamin A, C, E, etc.), self-tanning agents (for example DHA, erythrulose, inter alia) and further cosmetic active compounds, such as, for example, bisabolol, LPO, ectoin, emblica, allantoin, bioflavonoids and derivatives thereof.

The present invention likewise relates to formulations, in particular cosmetic formulations, which, besides the pigment mixture according to the invention, comprise at least one constituent selected from the group of absorbents, astringents, antimicrobial substances, antioxidants, antiperspirants, antifoaming agents, antidandruff active compounds, antistatics, binders, biological additives, bleaches, chelating agents, deodorisers, emollients, emulsifiers, emulsion stabilizers, dyes, humectants, film formers, fillers, fragrances, flavours, insect repellents, preservatives, anticorrosion agents, cosmetic oils, solvents, oxidants, vegetable constituents, buffer substances, reducing agents, surfactants, propellant gases, opacifiers, UV filters and UV absorbers, denaturing agents, viscosity regulators, perfume and vitamins.

The invention also relates to the use of the pigment mixture according to the invention in paints, coatings, printing inks, security printing inks, plastics, ceramic materials, glasses, as tracer, in cosmetic formulations and for the preparation of pigment preparations and dry preparations.

The following examples are intended to explain the invention in greater detail, but without restricting it.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German Application No. DE102013012023.3, filed Jul. 19, 2013 are incorporated by reference herein.

EXAMPLES

Example 1

Preparation of Component A 200 g of the spherical $SiO_2$ particles having a $D_{90}$ value of 4-8 μm are coated with 300-330 g of $TiCl_4$ solution (400 g of $TiCl_4$/l) at a pH of 2-2.5 and subsequently with 300-310 g of sodium water-glass (13-15% by weight of $SiO_2$) at a pH of 7.8-8.2, and the mixture is subsequently stirred. The precipitated amounts of $TiO_2$ and $SiO_2$ are in each case 12-16% by weight, based on the total weight of the coated white particles.

Preparation of Component B

In parallel, 100 g of the spherical $SiO_2$ particles having a $D_{90}$ value of 4-8 μm are coated in another reaction vessel with 200 g of $TiCl_4$ solution (400 g of $TiCl_4$/l) at a pH of 2-2.5 and subsequently with 100-130 g of $FeCl_3$ solution (218 g of $FeCl_3$) at a pH of 3-3.5, and the mixture is subsequently stirred. The desired color is set (from ochre-yellow to reddish) by in-situ measurements of the Lab values. The precipitated amounts of $TiO_2$ and $Fe_2O_3$ are 16-19% by weight and 7-10% by weight respectively, based on the total weight of the coated yellow/reddish particles.

After the coating, the suspension is washed until salt-free, and the particles are filtered off and dried at 110° C. and sieved.

Depending on the desired color of the end product, 2-10% by weight, based on the weight of component A, of these yellow/reddish spherical particles (component B) are added to the suspension of component A, and the mixture is stirred for at least 15 min. After components A and B have settled, the supernatant solution is decanted off, the spherical particles are filtered off and washed until salt-free. After drying at 110° C., 100 g of the end product are calcined at 600° C. for 45 min and sieved.

Depending on the content of component B, hues from apricot (2-4% by weight) via pale pink (5-6% by weight) to strong pink (7-10% by weight) can be set.

The mixing ratio of component A and component B can also be set by weighing out the dry pigments.

Example 2

The mixtures of component A and component B as described in Example 1 can be adjusted in color through the choice of the calcination temperature. Starting at temperatures of 600 to 750° C., the hue shifts increasingly from pink/brownish/apricot into yellowish until the end product appears yellowish/white from 700° C. Pseudobrookite ($Fe_2TiO_5$) formation commences here.

USE EXAMPLES

Example A1: Eye Shadow Gel

| Raw material | | INCI | [%] |
|---|---|---|---|
| Phase A | | | |
| Timiron Super Gold | (1) | MICA, CI 77891 (TITANIUM DIOXIDE) | 15.00 |
| Pigment mixture from Example 1 | | | 7.00 |
| Carbopol Ultrez 21 | (2) | Acrylates/C10-30 Alkyl Acrylate crosspolymer | 0.30 |
| Aloe vera powder regular 200× | (3) | Aloe Barbadensis | 0.05 |
| Citric acid monohydrate | (1) | Citric Acid | 0.00 |
| Water, demineralized | | Aqua (Water) | 55.87 |
| Phase B | | | |
| Triethanolamine 90% Care | (4) | Triethanolamine, Aqua (Water) | 0.78 |
| Germaben II | (5) | Propylene Glycol, Diazolidinyl Urea, Methylparaben, Propylparaben | 1.00 |
| Glycerin, anhydrous | (1) | Glycerin | 2.00 |
| Water, demineralized | | Aqua (Water) | 13.00 |
| Phase C | | | |
| Lubrajel DV | (6) | Propylene Glycol, Polyglyceryl methacrylate | 5.00 |

Preparation:

The aloe vera powder is dissolved in the water of phase A, then all pigments and the pigment mixture and the remaining ingredients apart from the Carbopol are added and the mixture is dispersed. A few drops of citric acid are used in order to reduce the viscosity, then the Carbopol is scattered in with stirring. When completely dissolved, the pre-dissolved phase B is slowly stirred in (the mixture is not homogenized), and subsequently phase C is added. If necessary, the pHis adjusted to between 7.0-7.5 using citric acid solution.

A water-based eye shadow gel formulation containing aloe vera is obtained (extremely fast-drying and easy to apply using the fingers).

Sources of Supply:
(1) Merck KGaA/Rona®
(2) Noveon
(3) Terry Laboratoires, Inc.
(4) BASF AG
(5) ISP Global Technologies
(6) Guardian

Example A2: Creamy Eye Shadow

| Raw material | | INCI | [%] |
|---|---|---|---|
| Phase A | | | |
| Colorona Light Blue | (1) | MICA, CI 77891 (TITANIUM DIOXIDE) CI 77510 (FERRIC FERROCYANIDE) | 10.00 |
| Pigment mixture from Example 1 | | | 15.00 |
| Talc | (1) | Talc | 12.00 |
| Phase B | | | |
| Crodamol PMP | (2) | PPG-2Myristyl Ether Propionate | 32.80 |
| Miglyol 812 N | (3) | Caprylic/Capric Triglyceride | 12.00 |
| Syncrowax HGLC | (2) | C18-36 Acid Triglyceride | 10.00 |
| Syncrowax HRC | (2) | Tribehenin | 3.00 |
| Parteck® LUB STA | (1) | Stearic Acid | 3.00 |
| Antaron V-216 | (4) | PVP/Hexadecene Copolymer | 2.00 |
| Oxynex® K liquid | (1) | PEG-8, Tocopherol, Ascorbyl Palmitate, Ascorbic Acid, Citric Acid | 0.10 |
| Propyl 4-hydroxy-benzoate | (1) | Propylparaben | 0.10 |

Preparation:

Phase B is heated to about 80° C. until everything has melted and cooled to 65° C. with stirring. Then the ingredients of phase A are added with stirring, and the composition is poured into the packaging provided at 65° C., and allowed to cool to room temperature.

Sources of Supply:
(1) Merck KGaA/Rona®
(2) Croda GmbH
(3) Sasol Germany GmbH
(4) ISP Global Technologies

Example A3: Face Powder

| Raw material | | INCI | [%] |
|---|---|---|---|
| Phase A | | | |
| Pigment mixture from Example 1 | | | 20.00 |
| Unipure Yellow LC 182 | (1) | CI 77492 (Iron Oxides) | 1.20 |
| Unipure Red LC 381 | (1) | CI 77491 (Iron Oxides) | 0.20 |
| Unipure Brown LC 889 | (1) | CI 77491 (Iron Oxides) CI 77499 (Iron Oxides) | 0.30 |
| Magnesium stearate | (2) | Magnesium Stearate | 2.00 |
| Talc | (2) | Talc | 71.90 |
| Phase B | | | |
| RonaCare® all-rac-alpha-tocopheryl acetate | (2) | Tocopheryl Acetate | 0.30 |
| Perfume oil 200 529 | (3) | Perfume | 0.30 |
| Eutanol G | (4) | Octyldodecanol | 3.70 |
| Propyl 4-hydroxy-benzoate | (2) | Propylparaben | 0.10 |

Preparation:

The constituents of phase A are added to the mixer (for example La Moulinette from Moulinex) and are mixed for 2×10 seconds. The mixture is poured into a beaker, phase B is added, and is stirred in advance using a spatula. The mixture of phase A and phase B is added to the mixer and is processed for 3×10 seconds to give a homogeneous phase.

The pressing pressure for a powder tray having a diameter of 36 mm is about 25 bar.

Sources of Supply:
(1) Les Colorants Wackherr
(2) Merck KGaA/Rona®
(3) Fragrance Resources
(4) Cognis GmbH Example A4: Mattifying Foundation

| Raw material | | INCI | [%] |
|---|---|---|---|
| Phase A | | | |
| Water, demineralized | | Aqua (Water) | 57.89 |
| Pigment mixture from Example 1 | | | 6.00 |
| Glycerin (87% extra pure) | (1) | Glycerin, Aqua (Water) | 5.00 |
| RonaCare ® ectoin | (1) | Ectoin | 0.30 |
| Keltrol CG-SFT | (2) | Xanthan Gum | 0.15 |
| Triethanolamine 90% Care | (3) | Triethanolamine, Aqua (Water) | 0.13 |
| Phase B | | | |
| Kronos 1001 | (4) | CI 77891 (Titanium Dioxide) | 4.92 |
| Unipure Yellow LC 182 | (5) | CI 77492 (Iron Oxides) | 1.60 |
| Unipure Red LC 381 | (5) | CI 77491 (Iron Oxides) | 0.20 |
| Unipure Brown LC 889 | (5) | CI 77491 (Iron Oxides) CI 77499 (Iron Oxides) | 0.20 |
| Unipure Blue LC 686 | (5) | CI 77007 (Ultramarin Blue) | 0.08 |
| Phase C | | | |
| Miglyol 812N | (6) | Caprylic/Capric Triglyceride | 7.00 |
| Eutanol G | (7) | Octyldodecanol | 4.00 |
| Montanov 202 | (8) | Arachidyl Alcohol, Behenyl Alcohol, Arachidylglucoside | 4.00 |
| Avocado oil | (9) | Persea Gratissima (Avocado Oil) | 2.00 |
| Eusolex ® 9020 | (1) | Butyl Methoxydibenzoylmethane | 1.50 |
| Hydrolite-5 | (10) | Pentylene Glycol | 1.20 |
| Bentone gel GTCC V | (11) | Stearalkonium Hectorite, Propylene Carbonate, Caprylic/Capric Triglyceride | 1.00 |
| RonaCare ® all-rac-alpha-tocopheryl acetate | (2) | Tocopheryl Acetate | 0.50 |
| Phenonip | (12) | Phenoxyethanol, Butylparaben, Ethylparaben, Propylparaben, Methylparaben | 0.40 |
| Oxynex ® K liquid | (1) | PEG-8, Tocopherol, Ascorbyl Palmitate, Ascorbic Acid, Citric Acid | 0.03 |
| Phase D | | | |
| Simulgel EG | (8) | Sodium Acrylate/Sodium Acryloyldimethyltaurate Copolymer, Isohexadecane, Polysorbate 80 | 0.60 |
| Phase E | | | |
| Water, demineralized | | Aqua (Water) | 1.00 |

Preparation:

Keltrol is added slowly to the water of phase A and is dispersed. The remaining constituents of phase A are scattered in with stirring. The constituents of phase B are added to phase A and homogenized using the Ultra-Turrax T25 (red-blue setting, 13500-20500 rpm) for 3 min and check for agglomerates. Phase A/B and phase C are heated separately to 75° C. Phase C is added to phase A/B with stirring and homogenized for 2 min using the Ultra-Turrax T25 (yellow-green setting, 8000-9500 rpm). Phase D is added at between 55 and 60° C., phase E is added at 40° C., and cooled to room temperature with further stirring; the pH is adjusted to 7.0 using 30% citric acid, and is transferred into suitable containers.

A light, slightly opaque foundation is obtained which is suitable for all skin types. Avocado oil, vitamin E acetate and cell-protecting RonaCare® ectoin support the skin-care action.

Sources of Supply:
(1) Merck KGaA/Rona®
(2) C. P. Kelco
(3) BASF AG
(4) Kronos International Inc.
(5) Les Colorants Wackherr
(6) Sasol Germany GmbH
(7) Cognis GmbH
(8) Seppic
(9) Gustav Heess GmbH
(10) Symrise
(11) Elementis Specialities
(12) Clariant GmbH Example A5: Body Lotion

| Raw material | | INCI | [%] |
|---|---|---|---|
| Phase A | | | |
| Aloe vera gel 10× decolorised | (1) | ALOE BARBADENSIS | 2.00 |
| D-Panthenol | (2) | PANTHENOL | 0.40 |
| Pigment mixture from Example 1 | | | 6.00 |
| RonaCare ® allantoin | (3) | ALLANTOIN | 0.20 |
| Glycerin, anhydrous | (3) | GLYCERIN | 4.00 |
| Water, demineralized | | AQUA (WATER) | 67.57 |
| Phase B | | | |
| Protelan AGL 95/C | (4) | SODIUM COCOYL GLUTAMATE | 6.00 |
| Cosmacol EMI | (5) | DI-C12-13 ALKYL MALATE | 3.00 |
| Eutanol G | (6) | Octyldodecanol | 3.00 |
| Jojoba oil | (7) | SIMMONDSIA CHINENSIS (JOJOBA OIL) | 1.50 |
| Tegosoft TN | (8) | C12-15 Alkyl Alkyl benzoate | 1.50 |
| Carbopol ETD 2020 | (9) | Acrylates/C10-30 Alkyl Acrylate Crosspolymer | 0.60 |
| Phenonip | (10) | Phenoxyethanol, Butylparaben, Ethylparaben, Propylparaben, Methylparaben | 0.60 |
| RonaCare ® bisabolol | (3) | Bisabolol | 0.50 |
| RonaCare ® all-rac-alpha-tocopheryl acetate | (3) | Tocopheryl Acetate | 0.50 |
| Oxynex ® ST liquid | (3) | Diethylhexyl Syringylidenemalonate, Caprylic/Capric Triglyceride | 0.50 |
| Cremophor RH 410 | (11) | PEG-40 Hydrogenated Castor Oil | 0.30 |
| Oxynex ® K liquid | | PEG-8, Tocopherol, Ascorbyl Palmitate, Ascorbic Acid, Citric Acid | 0.03 |
| Phase C | | | |
| Perfume oil Lifetime DH10255/1 | (12) | Perfume | 0.50 |

| Raw material | INCI | | [%] |
|---|---|---|---|
| Phase D | | | |
| Water, demineralized | Aqua (Water) | | 1.00 |
| Germal 115 | (13) | Imidazolidinyl Urea | 0.30 |

Preparation:

The aloe vera and RonaCare® allantoin are pre-dissolved in the water of phase A with stirring, then the other constituents of phase A are added and heated to 60° C. The jojoba oil, Oxynex K liquid, Cosmacol EMI, Eutanol G and Tegosoft TN are added into a stirred vessel, then the Carbopol is incorporated homogeneously using the disperser disc (about 700 rpm, 20 min). Then the remaining constituents of phase B are added, and everything is stirred to give a homogeneous mixture, adding the Protelan AGL 95/C right at the end of phase B in order to prevent excessive incorporation of air. Phase A is incorporated into phase B (RT) at 60° C. with the aid of the disperser disc. Add phases C and D, then homogenized for 4 min using the Ultra-Turrax T50, speed 4, and cooled to room temperature.

pH (23° C.)=5.5-6.0

Viscosity: Brookfield DV II+Helipath, spindle C, 5 rpm, 24° C.=11200 mPa·s

Sources of Supply:
(1) Terry Laboratoires
(2) Alfa Aesar GmbH & Co. KG
(3) Merck KGaA/Rona®
(4) Zschimmer & Schwarz GmbH & Co.
(5) Nordmann, Rassmann GmbH & Co.
(6) Cognis GmbH
(7) Gustav Heess GmbH
(8) Evonik Goldschmidt GmbH
(9) Noveon
(10) Clariant GmbH
(11) BASF AG
(12) Parfex
(13) ISP Global Technologies The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A pigment mixture consisting of components A and B:
component A consists of spherical base particles having a particle-size distribution $D_{90}$ of 0.5-15 µm and coating layers, wherein the coating layers consist of a $TiO_2$ layer, a $SiO_2$ layer, and optionally an outer protective layer, wherein said spherical base particles are completely covered on their surface firstly with the $TiO_2$ layer and subsequently with the $SiO_2$ layer, and
component B consists of spherical base particles having a particle-size distribution $D_{90}$ of 0.5-15 µm and coating layers, wherein the coating layers consist of a $TiO_2$ layer, an iron oxide layer or with a layer of a mixture of $TiO_2$ and iron oxide, and optionally an outer protective layer, said spherical base particles are completely covered on their surface firstly with the $TiO_2$ layer and subsequently with the iron oxide layer or with the layer of the mixture of $TiO_2$ and iron oxide.

2. The pigment mixture according to claim 1, wherein the spherical base particles of component A and component B are magnesium silicate, aluminum silicate, alkali-metal aluminum silicates, alkaline-earth metal aluminum silicates, $SiO_2$ spheres, glass beads, hollow glass beads, nylon, aluminum oxide beads, polymeric beads comprising ethylene-acrylic acid copolymers, ethylene-methacrylate copolymers, HDI-trimethylol hexyl lactone copolymers, nylon, polyacrylates, polymethyl methacrylate copolymers, polyethylene, polymethylsilsesquioxanes or mixtures thereof.

3. The pigment mixture according to claim 1, wherein the spherical base particles of component A and/or the spherical base particles of component B are $SiO_2$.

4. The pigment mixture according to claim 1, wherein the spherical base particles of component A and the spherical base particles of component B each consist of $SiO_2$.

5. The pigment mixture according to claim 1, wherein, in component B, the iron oxide of the iron oxide layer or of the layer of the mixture of $TiO_2$ and iron oxide is $Fe_2O_3$.

6. The pigment mixture according to claim 1, wherein, in component A, the $TiO_2$ of the $TiO_2$ layer is $TiO_2$ in anatase modification.

7. The pigment mixture according to claim 1, wherein the $TiO_2$ layer of component A has a layer thickness of 10-500 nm.

8. The pigment mixture according to claim 1, wherein the $SiO_2$ layer of component A has a layer thickness of 10-500 nm.

9. The pigment mixture according to claim 1, wherein, in component B, the $TiO_2$ of the $TiO_2$ layer is $TiO_2$ in anatase modification.

10. The pigment mixture according to claim 1, wherein the $TiO_2$ layer of component B has a layer thickness of 50-400 nm.

11. The pigment mixture according to claim 1, wherein, in component B, the coating layers consist of the $TiO_2$ layer, the iron oxide layer, and optionally the outer protective layer, and the iron oxide layer of component B has a layer thickness of 5-300 nm.

12. The pigment mixture according to claim 1, wherein, in component B, the coating layers consist of the $TiO_2$ layer, the layer of the mixture of $TiO_2$ and iron oxide, and optionally the outer protective layer, and the layer of the mixture of $TiO_2$ and iron oxide of component B has a layer thickness of 55-700 nm.

13. The pigment mixture according to claim 1, wherein components A and B are mixed in a weight ratio of 99:1 to 90:10.

14. The pigment mixture according to claim 1, wherein component A and/or component B includes the outer protective layer for increasing light, temperature or weather stability compared to pigment without said layer.

15. The pigment mixture according to claim 1, wherein the spherical base particles of both component A and component B have a $D_{90}$ value of 4-15 µm.

16. The pigment mixture according to claim 1, wherein the spherical base particles of both component A and component B are having a $D_{90}$ value of 4-8 µm.

17. In paints, coatings, printing inks, security printing inks, plastics, ceramic materials, glasses, in cosmetic formulations, tracers, fillers or dry preparations comprising a pigment, the improvement wherein the pigment comprises a pigment of claim 1.

18. A formulation comprising the pigment mixture according to claim 1, and at least one absorbent, astringent, antimicrobial substance, antioxidant, antiperspirant, antifoaming agent, antidandruff active compound, antistatic, binder, biological additive, bleach, chelating agent, deodorizer, emollient, emulsifier, emulsion stabilizers, dye, humectant, film former, filler, fragrance, flavor, insect repellent, preservative, anticorrosion agent, cosmetic oil, solvent, oxidant, vegetable constituent, buffer substance, reducing agent, surfactant, propellant gas, opacifier, UV filter, UV absorber, denaturing agent, viscosity regulator, perfume or vitamin.

19. A process for the preparation of the pigment mixture according to claim 1, comprising covering the spherical base particles of components A and B with the coating layers by wet-chemical coating or by a CVD or PVD process, and component A and component B are subsequently mixed with one another.

20. The process according to claim 19, further comprising, after mixing component A and component B with one another, subjecting the mixture to calcination at a temperature of between 250 and 1100° C.

21. The process according to claim 19, further comprising, after mixing component A and component B with one another, subjecting the mixture to calcination at a temperature of between 35° and 900° C.

* * * * *